United States Patent
Fork

(10) Patent No.: US 9,938,024 B1
(45) Date of Patent: Apr. 10, 2018

(54) OBJECT REDIRECTION USING ENERGETIC PULSES

(71) Applicant: Richard Fork, Madison, AL (US)

(72) Inventor: Richard Fork, Madison, AL (US)

(73) Assignee: Board of Trustees of the University of Alabama, for and on behalf of the University of Alabama in Huntsville, Huntsville, AL (US)

(*) Notice: Subject to any disclaimer, the term of this patent is extended or adjusted under 35 U.S.C. 154(b) by 42 days.

(21) Appl. No.: 15/241,919

(22) Filed: Aug. 19, 2016

Related U.S. Application Data

(60) Provisional application No. 62/207,741, filed on Aug. 20, 2015.

(51) Int. Cl.
| | | |
|---|---|---|
| G01C 21/24 | (2006.01) | |
| B64G 1/36 | (2006.01) | |
| B64G 1/10 | (2006.01) | |
| B64G 1/24 | (2006.01) | |

(52) U.S. Cl.
CPC .............. B64G 1/36 (2013.01); B64G 1/1021 (2013.01); *B64G 2001/1028* (2013.01); *B64G 2001/245* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,535,543 A | * | 10/1970 | Dailey | B64G 1/22 165/104.26 |
| 4,318,517 A | * | 3/1982 | Salkeld | B64G 1/10 244/158.2 |
| 5,170,352 A | * | 12/1992 | McTamaney | G05D 1/0236 318/587 |
| 5,421,540 A | * | 6/1995 | Ting | B64G 1/1078 244/158.1 |
| 6,748,325 B1 | * | 6/2004 | Fujisaki | G01C 21/00 701/301 |
| 6,936,760 B2 | * | 8/2005 | Rogers | B64G 1/428 136/244 |
| 7,119,732 B1 | * | 10/2006 | Lam | G01S 13/003 342/118 |
| 8,019,712 B2 | * | 9/2011 | Rigdon | G06N 5/04 706/46 |

(Continued)

OTHER PUBLICATIONS

Fork, et al., "Mode-Locked Lasers Applied to Deflecting a Near Earth Object on Collision Course with Earth," Electrical Computer Engineering Department, University of Alabama in Huntsville, 2011, pp. 1-4.

(Continued)

*Primary Examiner* — Jonathan L Sample
(74) *Attorney, Agent, or Firm* — Maynard Cooper & Gale, P.C.; Jon E. Holland

(57) ABSTRACT

An object redirection system may generate a high-resolution three-dimensional map of a surface of a target. Based on the map, the system may identify locations on the target's surface and direct energetic pulses toward the target at the locations. The system may continuously update the map of the target and continue emitting pulses at the target with reference to the map in order to achieve a desired velocity of the target within a desired timeframe.

2 Claims, 2 Drawing Sheets

(56) References Cited

U.S. PATENT DOCUMENTS

| | | | | |
|---|---|---|---|---|
| 8,193,968 B1* | 6/2012 | Kia | ............ | B64G 3/00 342/118 |
| 8,511,614 B2* | 8/2013 | Robinson | ............ | B64G 3/00 244/158.4 |
| 9,038,957 B1* | 5/2015 | Fork | ............ | B64G 1/10 244/158.4 |
| 9,038,959 B2* | 5/2015 | Andoh | ............ | B64G 1/242 244/171.1 |
| 9,499,285 B2* | 11/2016 | Garber | ............ | B64G 1/66 |
| 9,573,702 B1* | 2/2017 | Jacomb-Hood | ............ | B64G 1/24 |
| 2005/0109879 A1* | 5/2005 | Patterson | ............ | F03H 99/00 244/53 R |
| 2010/0295940 A1* | 11/2010 | Schwarte | ............ | G01B 11/026 348/135 |
| 2011/0058248 A1* | 3/2011 | Vodopyanov | ............ | G02F 1/39 359/330 |
| 2011/0156498 A1* | 6/2011 | Criswell | ............ | B64G 1/428 307/149 |
| 2013/0075534 A1* | 3/2013 | Taylor | ............ | B64G 4/00 244/158.2 |
| 2016/0070265 A1* | 3/2016 | Liu | ............ | B64C 39/024 701/3 |

OTHER PUBLICATIONS

Baumann, et al., "Comb-calibrated laser ranging for three-dimensional surface profiling with micrometer-level precision at a distance," NIST, 2014, pp. 1-15.

Kienel, et al., "12 mJkW-class ultrafast fiber laser system using multidimensional coherent pulse addition," Optical Society of America, 2016, pp. 1-4.

Hernandez-Rueda, et al., "Plasma dynamics and structural modifications induced by femtosecond laser pulses in quartz," SciVerse Science Direct, Applied Surface Science, 2011, pp. 1-5.

* cited by examiner

OBJECT REDIRECTION USING ENERGETIC PULSES

CROSS REFERENCE TO RELATED APPLICATION

This application claims priority to U.S. Provisional Patent Application No. 62/207,741, entitled "Asteroid Redirection Using Energetic Synchronized Femtosecond Pulses" and filed on Aug. 20, 2015, which is incorporated herein by reference.

RELATED ART

It may be desirable to alter the trajectory of an object in outer space for various reasons. For example, an asteroid, debris, or other object that is approaching the earth may be on a path that will cause it to collide with the earth, possibly resulting in significant damage. Assuming detection of the object occurs sufficiently early, various techniques have been proposed to reduce the risk of collision with the earth, such as by using explosives to destroy it or alter its path. However, most of these techniques involve a substantial risk of initial failure with few remedial safeguards and lack the mechanisms for maintaining control of the object's trajectory until it is on a safe path. Thus, more robust and reliable methods for altering paths of objects in outer space are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods of object redirection using energetic pulses. As described further in U.S. Provisional Patent Application No. 62/207,741, entitled "Asteroid Redirection Using Energetic Synchronized Femtosecond Pulses" and filed on Aug. 20, 2015, which is incorporated herein by reference, an object redirection system may identify an object for which redirection is desired, determine a velocity (i.e., speed and direction) of the object and generate a three-dimensional map of the object's surface. Based on the object's velocity and the three-dimensional map, the system may identify a plurality of locations on the surface of the object that, when impacted by an energetic pulse, will apply thrust to the object in a desired manner. Specifically, the locations may be selected so that the system can "steer" the object in a desired direction (e.g., to avoid a collision with earth).

In an exemplary embodiment, a plurality of spacecraft of the system may emit a plurality of energetic pulses at the selected locations. Energy from the energetic pulses may be transformed into direct propulsive thrust on the surface of the object to achieve a desired velocity of the object over time. The system may continuously update the three-dimensional map of the object's surface (e.g., by performing additional scans of the object's surface) and monitor the plurality of locations and velocity of the object including selecting new locations for the energetic pulses as the object rotates or otherwise moves with respect to the spacecraft. In this regard, the spacecraft may continue to emit the pulses at the selected locations until a desired velocity of the object has been achieved or until debris from the pulses obscures a path between a spacecraft and a location. When the system detects this and additional redirection is required to achieve the desired velocity, the system may select a plurality of alternate locations on the object's surface. The spacecraft may continue to emit energetic pulses toward the surface of the object, and the system may continue updating the three-dimensional map of the object's surface and selecting new locations for directing the plurality of pulses as necessary to achieve the desired velocity.

Figure 1:
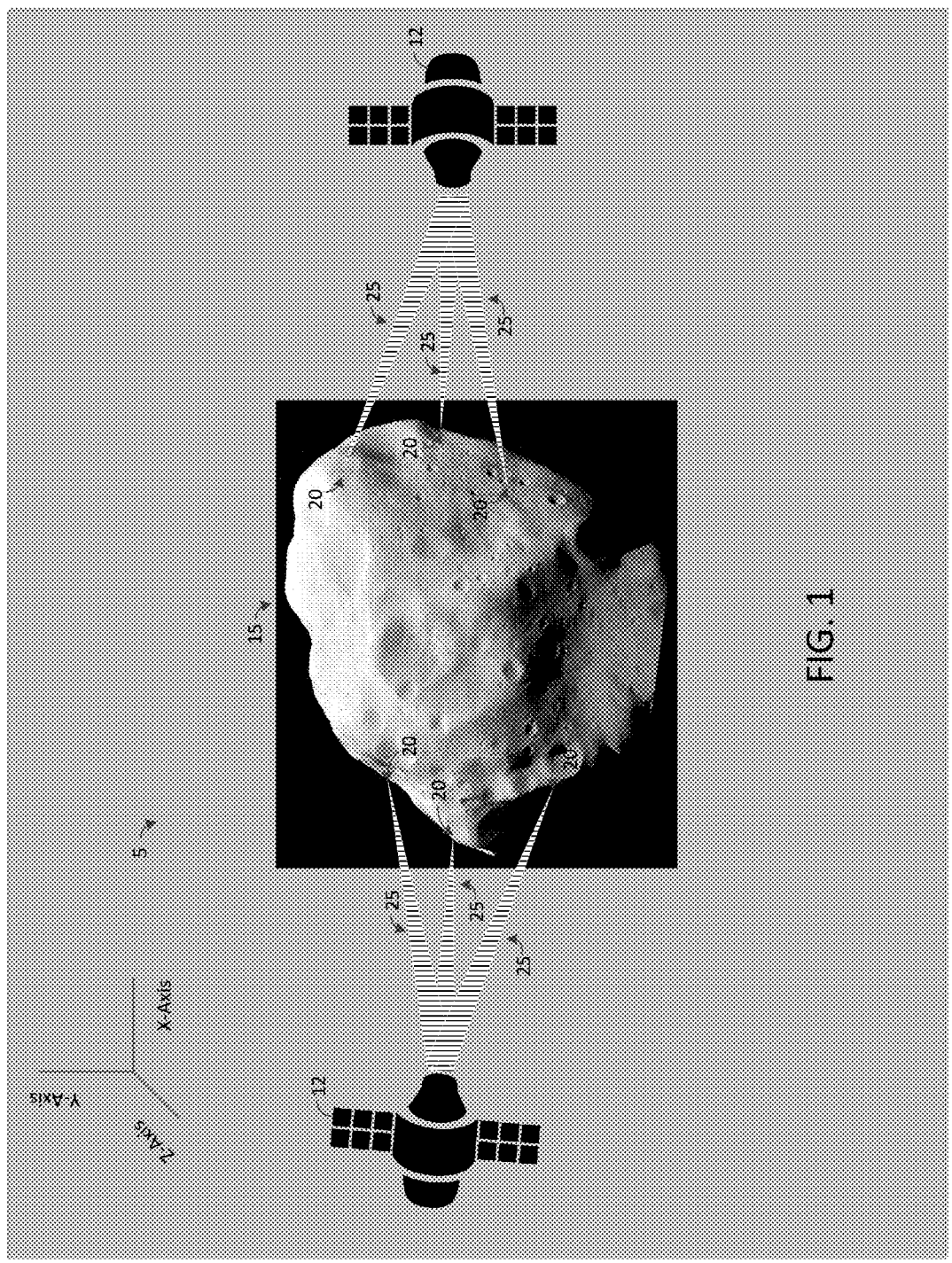
FIG. 1 depicts an exemplary embodiment of an object redirection system.

FIG. 1 depicts an exemplary embodiment of an object redirection system 5 in accordance with some embodiments of the present disclosure. The system 5 may comprise a plurality of spacecraft 12 configured to perform three-dimensional mapping (e.g., high-spatial resolution mapping) a surface of an object 15 object (sometimes referred to herein as a "target") in outer space. Based on the mapping, the system 5 may identify a plurality of locations 20, referred to hereafter as "target locations," (e.g., a flat surface constituting an "optical micro-engine") on the surface of the target 15 suitable for receiving energetic pulses 25 (e.g., optical energy) in order to achieve a desired velocity of the target 15. Each of the plurality of spacecraft 12 may be positioned close to the target 15, for example, within approximately 20 meters, and may direct propulsive thrust on the target 15 by emitting a plurality of energetic pulses 25 at the target 15. Other distances are possible in other embodiments. Each of the energetic pulses 25 may impact the target 15 and deliver energy to the target 15 at a target location 20. As described below, the energy may be converted into thrust, altering the velocity of the target 15. The plurality of spacecraft 12 may continue emitting the plurality of energetic pulses 25 over time until the target 15 reaches a desired velocity.

In some embodiments, the target 15 may be an object in outer space determined to have a trajectory that risks collision with the earth, a spacecraft, a resource, or other object. In some embodiments, the target 15 may be a large piece of debris remaining in orbit from a human space mission (e.g., space junk), such as a rocket body or defunct satellite. In the embodiment of FIG. 1, the target 15 is an irregularly-shaped asteroid moving along the X-Axis from left to right. The target 15 may be other objects in other embodiments. In some embodiments, they system 5 may intercept and redirect a plurality of targets 15, though FIG. 1 depicts only one target 15 for simplicity.

In the embodiment of FIG. 1, two spacecraft 12 are shown, though the system 5 may comprise any number of spacecraft 12 in other embodiments. Features ascribed to a spacecraft 12 herein may be common among one or more of the plurality of spacecraft 12 of the system 5. A spacecraft 12 may be a conventional spacecraft and may comprise suitable components for adjusting, controlling and maintaining a position, orientation and velocity of the spacecraft 12, such as multidirectional thrusters. A spacecraft 12 further may comprise components (e.g., thrusters) for co-orbiting the target 15, travelling with the target at a similar velocity, or otherwise maintaining an appropriate position of the spacecraft 12 relative to a target 15 (e.g., co-orbiting with target 15), such as a pre-determined distance from the target 15 or from other spacecraft 12 or objects. As an example, for large targets 15, such as large asteroids, the spacecraft 12 may orbit around the target 15 within the gravitational pull of the target 15. In other examples, the spacecraft may co-orbit with the target 15 by traveling on the same or substantially similar ephemeris as the target 15, such as by leading or trailing the target 15.

By co-orbiting with the target 15, the spacecraft 12 may travel with the target 15 as it travels along a trajectory such that the spacecraft 12 remains at a substantially fixed position relative to the target 15, though it is possible for the spacecraft 12 to move with respect to the target 15. In this regard, spacecraft 12 may maintain a distance from the target 15 suitable for directing thrust on the target through emission of energetic pulses 25. In some embodiments, a spacecraft 12 may be deployed to a target 15 using any suitable technique, such as via conventional spacecraft launched from earth.

In some embodiments, a spacecraft 12 may apply propulsive thrust to redirect a target 15 to a desired velocity by emitting energetic pulses 25 at a plurality of target locations 20 on the target 15. A spacecraft 12 may comprise components suitable for emitting energetic pulses 25 (e.g., one or more laser emitters). As described in further detail below, a plurality of suitable target locations 20 may be identified in order to efficiently use energetic pulses 25 to provide thrust to the target 15 in one or more desired directions. Energy from an energetic pulse 25 (e.g., optical energy) may be converted to propulsive thrust when the pulse 25 impacts the surface of the target 15.

In some embodiments, an energetic pulse 25 emitted by spacecraft 12 may have suitable characteristics (e.g., wavelength, period, etc.) for delivering a desired amount of energy to the target 15 in applicable conditions (e.g., a vacuum, as in outer space) and distance from spacecraft 12 to target 15. Pulses 25 may be optical in nature (e.g., a propagating wave of optical energy, laser, or otherwise) and may comprise sufficient intensity and energy density (e.g., approximately 14.4 $J/cm^2$) to transfer a desired propulsive thrust to a target 15 on impact. An energetic pulse 25 may introduce electrons to a surface of the target 15 on impact, and electrons from the surface may be rapidly ejected. Surface materials (e.g., molecules) may become dislodged as a result of the electron ejection, resulting in dislodging of material ("ejecta") from the surface of the target 15 (i.e., ablation of the surface). It has been observed that material dislodged from the target 15 due to impact from an energetic pulse 25 may follow a path that is approximately normal to the surface of the target 15 (e.g., the flat surface of the target location 20). In this regard, a momentum of the dislodged material may provide thrust to the target 15 in a direction that is opposite the path of the dislodged material. In this regard, much of the dislodged material is ejected in a direction substantially normal to the surface such that a substantial portion of the momentum is directed inward in a direction normal to the surface.

Note that a spacecraft 12 may emit energetic pulses 25 at a frequency sufficient to apply thrust to a target 15 within an applicable time constraint, such as by applying energetic pulses 25 over a suitable period (e.g., days, months or years) in order to adequately steer the target 15 as may be desired, such as to a path to prevent a collision with the earth. In an exemplary embodiment, a spacecraft 12 may be configured to emit energetic pulses 25 at a rate of about one pulse 25 per one or more femtoseconds (fs), but a spacecraft 12 may emit energetic pulses 25 for other durations and at other frequencies in other embodiments. For example, in some embodiments, a pulse 25 may have a duration that is proportional to an amount of energy to be transferred (e.g., as constrained by pulse wavelength, distance to target 15, area of target location 20, or other factors). In an exemplary embodiment, each energetic pulse 25 may comprise an energy of at least 5 millijoules, but pulses 25 may comprise other amounts of energy in other embodiments. In some embodiments, an energetic pulse 25 may have a duration of 100 fs, and may transfer an amount of energy at least approximately one millijoule, though other durations, energy densities and characteristics of pulse 25 are possible.

In some embodiments, a spacecraft 12 may generate a high-resolution three-dimensional map of a target 15 using optical mapping pulses (not specifically shown). A spacecraft 12 may be configured to emit a plurality of optical mapping pulses (e.g., dual-frequency comb-calibrated optical pulse trains of lowest order Gaussian beams) toward the surface of the target 15. In some embodiments, each mapping pulse may comprise two different frequency comb signals for performing measurement of the surface of the target 15, but the plurality of optical mapping pulses may comprise any suitable frequency or combination of frequencies in other embodiments. In some embodiments, an optical mapping pulse may comprise any suitable characteristics for generating a three-dimensional map of the surface of the target 15 with sufficient resolution (e.g., near micron-level resolution). The surface of the target 15 may reflect the optical mapping pulses, and the spacecraft 12 may receive and measure returns of the optical mapping pulses. In some embodiments, the returns may be measured with reference to particular pre-determined points on the surface of the target 15 (e.g., "fiducial markers") to provide reference points for mapping as much of the surface of the target 15 as possible. In an exemplary embodiment, the spacecraft 12 may generate a map of the surface of the target 15 based at least on the fiducial markers and the measured returns. Note that the spacecraft 12 may comprise suitable components (e.g., a laser, a camera, a sensor, or other device) for emitting the optical mapping pulses and for mapping the surface of the target 15. Furthermore, in some embodiments, a plurality of spacecraft 12 may co-orbit a target 15 and perform mapping of portions of the surface of the target 15 in coordination with one another. In this regard, each of plurality of spacecraft 12 may generate a substantially complete map of the surface of the target 15, such as by communicating with other spacecraft 12 and exchanging mapping data with the other spacecraft 12. In yet other embodiments, a plurality of micro-spacecraft may perform the functionality assigned to one or more spacecraft 12, including generation of three-dimensional mapping of the target 15 identification of target locations 20, and emission of energetic pulses 25.

In some embodiments, spacecraft 12 may identify a plurality of target locations 20 with reference to the high-resolution map of the surface of the target 15. The plurality of target locations 20 may be identified so that a cumulative momentum provided by the energetic pulses 25 from a spacecraft 12 may control a direction of overall thrust exerted on the target 15. A target location 20 may be identified for a given energetic pulse 25, and the same target location 20 or a new target location 20 may be identified for each subsequent energetic pulse 25. Each target location 20 may be an approximately flat surface on the target 15 (sometimes referred to as an "optical micro-engine"), and may receive multiple energetic impulses 25 emitted by the spacecraft 12. In an exemplary embodiment, each spacecraft 20 may identify at least three target locations 20 where it will emit energetic pulses 25. In addition, a spacecraft 12 may emit pulses 25 approximately simultaneously at each target location 20. By identifying at least three target locations 20, and applying energetic pulses 25 to the target 15 approximately simultaneously, a steerable propulsive thrust may be applied to the target, resulting in efficient redirection of the target 15 as desired. In some embodiments, a system of multiple (e.g., at least three) ablative pulses 25 applied simultaneously may allow the system 5 to "steer" the target 15 and apply propulsive thrust to the target 15. In this regard, each target location 20 may be selected based on target surface characteristics, target dynamics (e.g., pitch, yaw, roll, etc.) and a desired velocity of the target 15. Note that each of the target locations 20 may be selected based on a determination that the target location 20 is of a size suitable for receiving an energetic pulse 25 and exerting thrust on the target 15 (e.g., one square millimeter or area of other size). In addition, a target location 20 may be selected based on information gathered by one or more other spacecraft 12 and communicated to the spacecraft 12. Target locations 20 may be selected based on other factors in other embodiments.

In some embodiments, each spacecraft 12 may maintain a map of the surface of the target 15, continuously updating the map in real-time. When an energetic pulse 25 impacts a surface of a target 15, it alters the surface of the target 15 significantly (e.g., by ablating the surface). In some embodiments, a relatively thin layer of material may be removed from the surface of the target 15, and may be thrown from the target location 20 in a direction that is essentially normal to the surface of the target 15. In this regard, it may be possible to select a direction in which material dislodged from the target 15 will be thrown, such as by selecting a location 20 having a surface normal in a desired direction. In this regard, the selection of the location 20 controls a direction of thrust applied to the target 15. In addition, material may be directed away from a path of energetic pulses 25 from a spacecraft 12, permitting continued direction of pulses 25 at the location 20 without contamination or compromise in quality of pulse 25 from ejected material.

Note that a cloud of material or ejecta may be created after a pulse 25 impacts the target 15. In some embodiments, dislodged ejecta may become dense and form a cloud after a pulse 25 impacts the target 15 at a location 25. After a pulse 25 impacts the target 15, the cloud may grow sufficiently dense and obscure the target location 20. In this regard, the cloud may prevent or block a pulse 25 having a desired quality (e.g., intensity) from reaching the surface of the target 25. Although a cloud of ejecta created by a pulse 25 may dissipate within a relatively short time interval, efficient redirection of target 15 may require emission of additional pulses 25 before such interval expires. Thus, a new location 20 may be identified for directing one or more pulses 25 for at least an amount of time equal to the time interval during which sufficient dissipation of a cloud of ejecta may occur. New locations 20 may be selected based on a continuously updated map of the target 15, and a location 20 may be used again for directing pulses 25 at least after expiration of a dissipation interval, or other time as may be desired. In an exemplary embodiment, a spacecraft 12 may continue to update and maintain a map of the evolving surface target 15 while it is emitting energetic pulses 25 in order to identify alternate target locations 20 suitable for efficiently redirecting the target 15 as desired. By continuously updating its map of the surface of the target 15, a spacecraft can ensure in real-time that it is emitting energetic pulses 25 that impact the target 15 at target locations 20 that will result in desired redirection of the target 15 within a desired time constraint.

The selection of target locations 20 may be controlled such that a new target location 20 is selected for a given emitter 250 after each pulse or after a defined number of pulses. Thus, new target locations 20 are continuously selected for the emitter 250 over time so that an emitter successively ablates different target locations 20 helping to avoid interference caused by the ejecta material. Ablation of the target locations 20 may be tracked so that the selection of new target locations 20 may be based on which locations 20 have previously been recently ablated. That is, if a certain vicinity of the object's surface is ablated (a "first ablation event"), selection of new locations 20 may be controlled such that a location within the vicinity is not selected for another ablation event until at least a predefined amount of time has expired since the first ablation event. Thus, it can be ensured that ejecta material from the first ablation event has likely dissipated before another ablation event is scheduled for the same vicinity.

Figure 2:
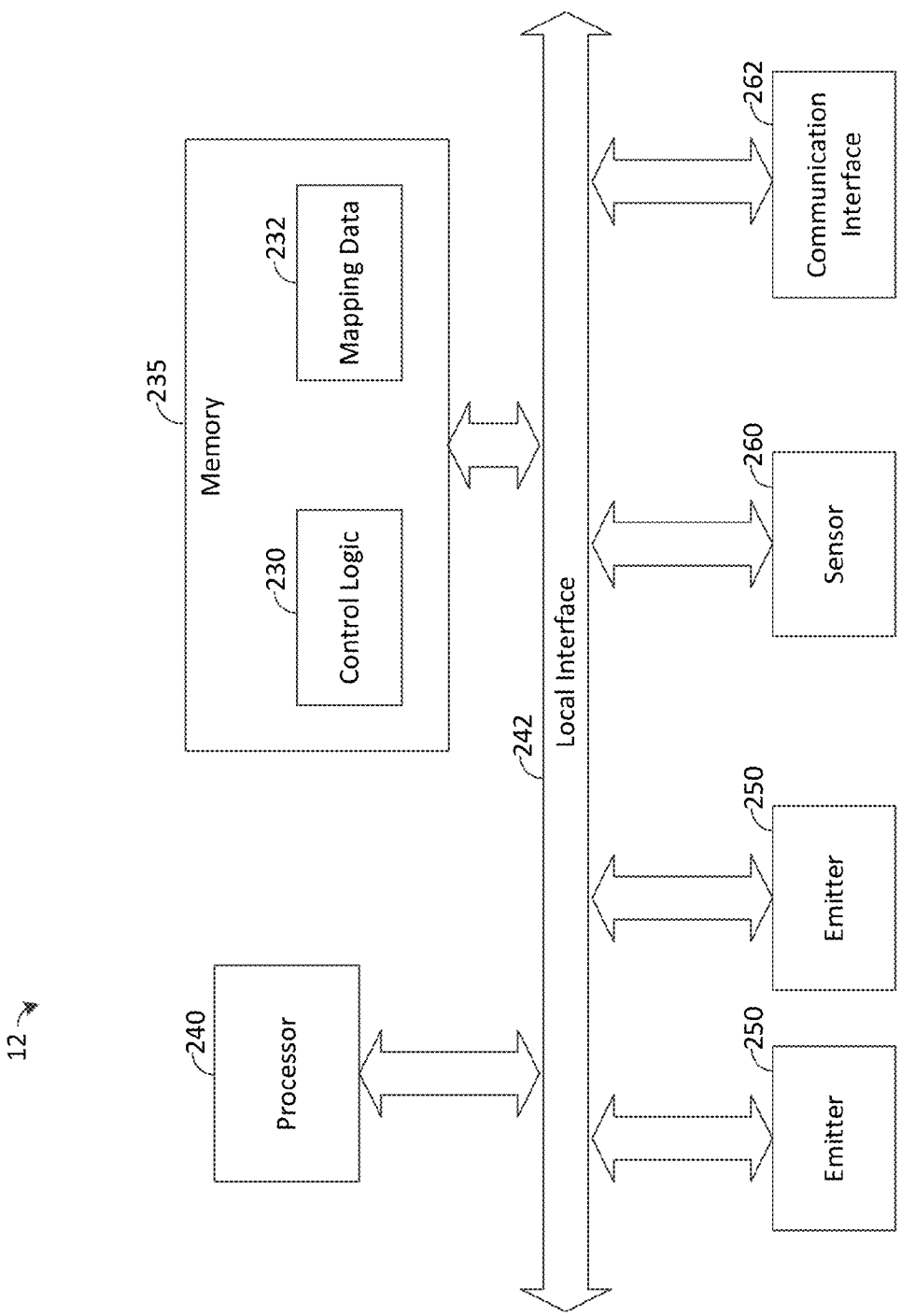
FIG. 2 is a block diagram illustrating an exemplary embodiment of a spacecraft of an object redirection system, such as is depicted by FIG. 1.

FIG. 2 depicts a block diagram of an exemplary embodiment of a spacecraft 12 of an object redirection system 5. As shown by FIG. 2, the spacecraft 12 has control logic 230 and mapping data 232 stored in memory 235. The control logic 230 uses information about a target 15 stored in mapping data 232 to control various operations of the spacecraft 12 necessary to perform the redirecting activities of the system 5 described herein. It should be noted that the control logic 230 can be implemented in software, hardware, firmware, or any combination thereof. In the exemplary embodiment illustrated in FIG. 2, the control logic 230 is implemented in software and stored in the memory 235 of the spacecraft 12.

Note that the control logic 230, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the spacecraft 12 depicted by FIG. 2 comprises at least one conventional processor 240, such as a digital signal processor (DSP) or a central processing unit (CPU), that communicates to and drives the other elements within the spacecraft 12 via a local interface 242, which can include at least one bus. In some embodiments, the spacecraft 12 may have any number of processors for carrying out the functionality of the spacecraft 12 (e.g., as performed by executing the logic 230) as described herein. In the embodiment of FIG. 2, a communication interface 262 can be used to communicate with other components of the system 5, such as other spacecraft 12, for example, to communicate information indicative of the redirection, or may perform other communication operations as desired. In some embodiments, the communication interface 262 may include hardware for communicating via any suitable communication protocol, such as radio, Bluetooth, NFC communication, or otherwise.

In some embodiments, system 5 may comprise a control system for controlling the operation and functionality of the various resources of one or more spacecraft 12 as described herein. For example, the control system may control operations of one or more spacecraft 12 for performing mapping and thrust direction on a target 15 via energetic pulses 25 as described further below. Such control system may be distributed across any number of spacecraft 12 and may reside at other locations, as may be desired. As an example, the control system may be implemented using one or more processors 240 programmed with the control logic 230, when the control logic 230 is implemented in software, on one or more spacecraft 12 for controlling the emitters 250 to perform the functionalities described herein. In this regard, mapping data indicative of a surface of the target 15 may be transmitted to control logic 230 on one of the spacecraft 12, referred to as a "master satellite," and such control logic 230 may select target locations for a plurality of spacecraft 12, referred to as "slave spacecraft," based on the mapping data according to techniques described in more detail below. The target locations selected for a given slave spacecraft 12 may then be communicated to such slave spacecraft 12, and the control logic 230 on board the slave spacecraft 12 may be configured to control the satellite's emitters 250 to direct energetic pulses at the selected target locations. Alternatively, the control logic 230 for each spacecraft 12 may be configured to analyze mapping data and independently select its target locations in order to achieve a desired thrust. Various other configurations of the control system and techniques for selecting target locations and controlling the emitters 250 are possible.

In some embodiments, a plurality of emitters 250 may emit energetic pulses 25 and mapping pulses to achieve the functionality of spacecraft 12 described herein. FIG. 2 depicts two emitters 250 for simplicity, but a spacecraft 12 may comprise any number of emitters in other embodiments. An emitter 250 may comprise any suitable component for performing continuous mapping operations of the surface of the target 15, such as a laser, or other optical emitter. An emitter 250 also may comprise any suitable component for emitting energetic pulses 25 at a target 15. Further, characteristics of each emitter 250 may be adjusted (e.g., aim, focus, power, etc.). In this regard, each emitter 250 may have an adjustable aim, enabling it to change direction of its emission without requiring a change in position of the spacecraft 12 (such as by command from control logic 230). For example, if control logic 230 determines that a target location 20 has been obscured by ejecta (e.g., based on mapping data 232), control logic 230 may direct the emitter 250 to aim its emissions at a new target location 20. Control logic 230 also may direct an emitter 250 to perform mapping operations of the target 15. Each emitter 250 may be adjusted independently of other emitters 250, or may be linked to move synchronously with one or more other emitters 250.

In some embodiments, a spacecraft 12 may comprise a sensor 260 for sensing optical returns of optical mapping pulses reflected from the surface of a target 15 as part of continuous mapping operations of the spacecraft 12. The sensor 260 may be any suitable optical sensor, such as an photosensitive cell, camera, or other optical sensor. The sensor 260 may sense optical returns in any suitable of spectra, including visible, infrared, ultraviolet, or otherwise.

In some embodiments, mapping data 232 may comprise information about a surface of a target 15 generated by spacecraft 12. For example, data captured as part of continuous three-dimensional high-resolution mapping performed by spacecraft 12 may be stored as mapping data 232. Mapping data 232 also may comprise information generated by control logic 230, such as target locations 20 identified using mapping data 232, locations of fiducial markers on a surface of the target 15, or patterns indicative of ejecta potentially obscuring a target location 20. In some embodiments, mapping data 232 may comprise prior versions of maps of a target 15 for use by the control logic 230 in identifying new target locations 20 (e.g., when a target location 20 becomes obscured or when rotation of the target requires selection of new target locations 20 to achieve thrust in a desired direction). Mapping data 232 comprises any suitable information for achieving the functionality of system 5 described herein and may comprise other information in other embodiments.

In some embodiments, control logic 230 may be configured to carry out operations and general functionality of the spacecraft 12 describe herein, including mapping of a surface of a target 15, identification and monitoring of target locations 20, emission of energetic pulses 25, and tracking velocity of a target 15, and positioning of the spacecraft 12. Although not explicitly shown by FIG. 2, in some embodiments, the control logic 230 may be configured to control resources of a spacecraft 12 (e.g., propulsion, sensor and communication systems) to place the spacecraft 12 in a proper orientation for performing redirection of a target 15 as described herein. In addition, control logic 230 may be configured to control various resources of the spacecraft 12 and make any adjustments necessary to maintain proper orientation of the spacecraft 12 for redirecting a target 15.

In some embodiments, the control logic 230 may be configured to perform three-dimensional mapping of a target 15. The control logic 230 may provide a signal to an emitter 250 to begin three-dimensional mapping of a target 15 (e.g., begin emitting an optical mapping pulse). Control logic 230 may monitor function of the emitter 250 to ensure continuous mapping of a surface of the target 15. Control logic 230 may further be configured to provide a signal to emitter 250 to end mapping, such as when redirection of a target 15 to a desired velocity has been achieved.

In some embodiments, control logic 230 may be configured to collect data received by sensor 260, such as optical returns of optical mapping pulses from an emitter 250 and store it as mapping data 232. Control logic 230 may be configured to maintain a real-time map of the target 15 in mapping data 232 using data from sensor 260. In some embodiments, control logic 230 may do so by analyzing data received by sensor 260 using techniques such as by machine learning, iterative processing, or other suitable methods.

Control logic 230 may be configured to identify target locations 20 using mapping data 232. Control logic 230 may be configured to identify a target location 20 using any suitable information, though in an exemplary embodiment, control logic 230 may identify a location using information about a surface of a target 15 (e.g., identification of suitable optical micro-engines on the surface), movement of the target 15 (e.g., velocity, rotation, etc.), desired target 15 velocity, position of the spacecraft 12 or other information. The target locations 20 may be identified so that an overall vector of thrust directed by energetic pulses 25 from a spacecraft 12 has a desired direction and magnitude in order to achieve desired redirection of a target 15. In some embodiments, control logic 230 may identify at least three target locations 20, though spacecraft 12 may identify any suitable number of target locations 20 in other embodiments. Control logic 230 may be configured to identify additional or alternative locations from time-to-time, such as when a target location 20 is obscured by rotation of the target 15 or when ejecta or debris from energetic pulses 25 becomes too dense. Further, control logic 230 may monitor previously obscured target locations 20 and may note when the target location 20 is no longer obscured.

In some embodiments, control logic 230 may be configured to control emission of energetic pulses 25 at target locations 20. Control logic 230 may monitor position of spacecraft 12 and, when suitably positioned relative to identified target locations 20 (e.g., while co-orbiting with target 15 or otherwise moving with target 15), may provide a signal to one or more emitters 250 to emit an energetic pulse 25 at a respective target location 20. Note that, as described above, at least three target locations 20 may be identified for emission of an energetic pulse 25. In an exemplary embodiment, control logic 230 may monitor information received by the sensor 260 and stored in mapping data 232 to ensure that an energetic pulse 25 from one or more emitters 250 reaches each target location 20. The control logic 230 may provide a signal to the one or more emitters 250 to emit an energetic pulse 25 when the control logic 230 determines that a suitable path exists between the target location 20 and respective emitter 250. In some embodiments, the control logic 230 may provide the signal to the one or more emitters 250 simultaneously, so that each of the one or more emitters 250 emits an energetic pulse 25 approximately simultaneously. Note that each energetic pulse 25 may, as described above, comprise characteristics (e.g., wavelength, energy density, pulse duration, etc.) based on a comparison between a current velocity of the target 15 and a desired target 15 velocity. The control logic 230 may note a current velocity of the target 15 based on information in mapping data 232, determine characteristics of one or more energetic pulses 25 that will apply a desired thrust vector to target locations 20 on the target 15, and provide a signal indicative of the characteristics of each respective pulse 25 to the one or more emitters 250. The control logic 230 may repeat this process for as many energetic pulses 25 as necessary to achieve a desired velocity of the target 15. In addition, the control logic 230 may continue monitoring the velocity of the target 15 (e.g., using information stored in mapping data 232 as described above) and may provide additional signals to the one or more emitters 250 until the target 15 reaches a desired velocity.

Now therefore, the following is claimed:

1. A system for redirecting an object in outer space, comprising:
    a plurality of emitters positioned on a plurality of spacecraft, the plurality of emitters including at least a first emitter positioned on a first spacecraft of the plurality of spacecraft and a second emitter positioned on a second spacecraft of the plurality of spacecraft, wherein the plurality of spacecraft are configured to move with the object as the object travels along a trajectory in outer space;
    at least one emitter of a second plurality of emitters positioned on at least one of the plurality of spacecraft;
    at least one sensor positioned on at least one of the plurality of spacecraft for sensing returns of optical signals emitted from the at least one emitter;
    memory for storing mapping data defining a map of the surface based on the returns;
    at least one processor for controlling the plurality of emitters such that each of the plurality of emitters emits a plurality of energetic pulses that impact a surface of the object causing matter from the surface to be ejected from the object, wherein a cumulative momentum of the ejected matter is sufficient to alter the trajectory of the object, the at least one processor configured to select target locations on the surface for the plurality emitters based on the mapping data, wherein the at least one processor is configured to control the plurality of emitters to direct the energetic pulses at the target locations such that the cumulative momentum over time alters the trajectory in order to avoid a collision with the object, wherein the at least one processor is configured to select a plurality of target locations for the first emitter based on the mapping data, and wherein the at least one processor is configured to control the first emitter such that energetic pulses from the first emitter are successively directed at each of the plurality of target locations for the first emitter as the object rotates.

2. A method for redirecting an object in outer space, comprising:
    moving a plurality of spacecraft with the object as the object travels along a trajectory;
    controlling a plurality of emitters such that each of a first plurality of emitters positioned on the plurality of spacecraft emits a plurality of energetic pulses that impact a surface of the object causing matter from the surface to be ejected from the object, wherein a cumulative momentum of the ejected matter is sufficient to alter a trajectory of the object;
    imaging a surface of the object using at least one sensor and a second plurality of emitters positioned on the plurality of spacecraft, thereby defining mapping data indicative of the surface; and
    selecting a plurality of target locations on the surface for the first plurality of emitters based on the mapping data,
        wherein the selecting comprises selecting target locations for one of the first plurality of emitters based on the mapping data,
        wherein the controlling comprises controlling the first plurality of emitters to direct the energetic pulses at the target locations such that the cumulative momentum over time alters the trajectory in order to avoid a collision with the object, wherein the controlling further comprises controlling the one of the first plurality of emitters such that energetic pulses from the one of the first plurality of emitters are successively directed at each of the target locations selected for the one of the first plurality of emitters as the object rotates.

* * * * *